United States Patent
Yale

[11] Patent Number: 5,879,588
[45] Date of Patent: Mar. 9, 1999

[54] TERBIUM-ACTIVATED GADOLINIUM OXYSULFIDE PHOSPHOR WITH REDUCED BLUE EMISSION

[75] Inventor: Ramon L. Yale, Ulster, Pa.

[73] Assignee: Osram Sylvania Inc., Danvers, Mass.

[21] Appl. No.: 936,662

[22] Filed: Sep. 24, 1997

[51] Int. Cl.⁶ .................................................. C09K 11/84
[52] U.S. Cl. ......................................................... 252/301.45
[58] Field of Search ......................................... 252/301.45

[56] References Cited

U.S. PATENT DOCUMENTS 3,904,546   9/1975   Mattis et al. ..................... 252/301.4 S

FOREIGN PATENT DOCUMENTS

WO 85/04179   9/1985   WIPO .

*Primary Examiner*—Melissa Bonner
*Attorney, Agent, or Firm*—Robert F. Clark

[57] ABSTRACT

A fluorine-free, terbium-activated gadolinium oxysulfide phosphor with an enhanced green:blue emission ratio is disclosed. The phosphor includes a gadolinium oxysulfide matrix of the nominal formula $Gd_{2-x}O_2S:xTb$, where x is 0.001–0.2. Silicon from metasilicic acid is incorporated in the matrix to enhance the green:blue emission ratio of the phosphor. A method of enhancing the green:blue ratio is also disclosed.

6 Claims, 2 Drawing Sheets

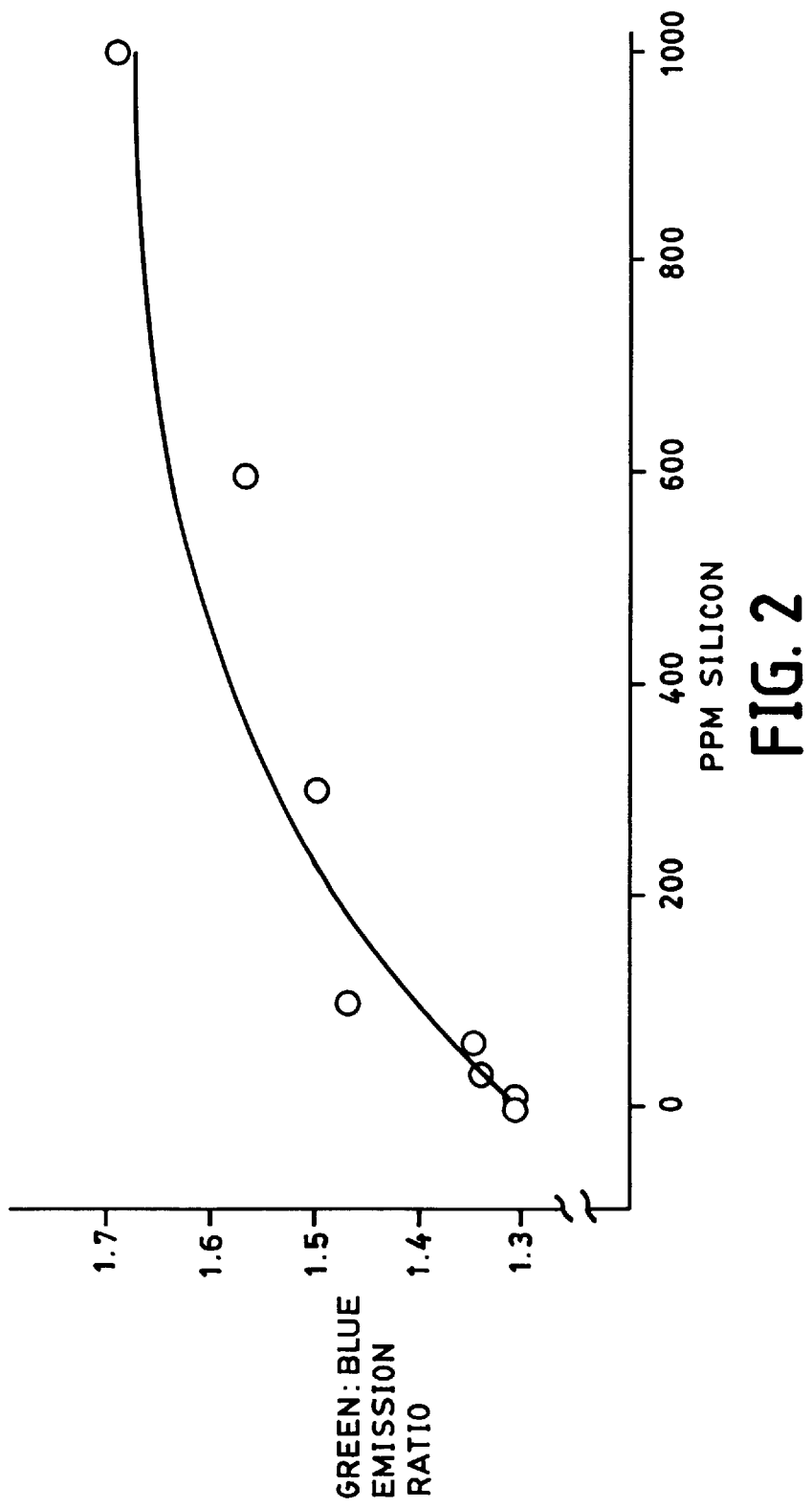

TERBIUM-ACTIVATED GADOLINIUM OXYSULFIDE PHOSPHOR WITH REDUCED BLUE EMISSION

BACKGROUND OF THE INVENTION

The present invention relates to rare earth oxysulfide particulate materials, and particularly relates to terbium-activated gadolinium oxysulfide phosphors exhibiting an enhanced green:blue emission ratio as well as a method for producing such enhancement.

Rare earth oxysulfides have long been recognized in the art as valuable luminescent materials. These phosphors are in the form of a solid solution having a matrix of the rare earth oxysulfide compound with a small amount of an activator or dopant dispersed throughout the matrix. The activator normally is also a rare earth element.

Among such rare earth activated rare earth oxysulfides is the blue-green emitting terbium-activated rare earth oxysulfide having the nominal formula:

$$Gd_{2-x}O_2S:xTb \qquad (1)$$

where x is 0.001 to 0.2. The phosphor is useful, e.g., in the field of x-ray intensifier screens. However, the spectral sensitivity of the x-ray film does not always precisely match the phosphor emission. Thus, it would be desirable to have the capability to adjust the green:blue emission ratio of the phosphor emission to tailor the phosphor emission to the spectral sensitivity of the x-ray film.

Accordingly, it is an object of the present invention to provide a terbium-activated gadolinium oxysulfide phosphor which overcomes the disadvantages of the prior art.

It is another object of the invention to provide a terbium-activated gadolinium oxysulfide phosphor in which the green:blue emission ratio of the phosphor emission is enhanced by the addition of silicon without the presence of fluorine in the phosphor matrix.

It is yet another object of the invention to provide a terbium-activated gadolinium oxysulfide phosphor in which the phosphor emission can be tailored to match to the spectral sensitivity of a particular x-ray film.

It is still another object of the invention to provide a method of enhancing the green:blue emission ratio of a terbium-activated gadolinium oxysulfide phosphor by adding silicon to the phosphor matrix without the presence of fluorine.

SUMMARY OF THE INVENTION

It has been found that adding a minute amount of silicon to terbium-activated gadolinium oxysulfide phosphors represented by the nominal formula $Gd_{2-x}O_2S:xTb$ (designated above as Formula 1), where x is 0.001 to 0.2, during their synthesis can significantly alter the green:blue emission ratio of the phosphor. Thus, in accordance with the above-mentioned objects, in one aspect the invention is a terbium-activated gadolinium oxysulfide phosphor with an enhanced green:blue emission ratio. The phosphor includes a gadolinium oxysulfide matrix of the nominal formula $Gd_{2-x}O_2S:xTb$, where x is 0.001–0.2. An amount of silicon sufficient to yield an enhanced green:blue ratio in the phosphor is incorporated in the matrix.

In another aspect, the invention is a method of enhancing the green:blue emission ratio of a terbium-activated gadolinium oxysulfide phosphor including a gadolinium oxysulfide matrix of the formula $Gd_{2-x}O_2S:xTb$, where x is 0.001–0.2. The method involves incorporating into the matrix an amount of silicon sufficient to yield an enhanced green:blue ratio in the phosphor. Preferably, the silicon is added to the starting formulation for producing the phosphor at a weight selected to achieve the desired amount of silicon in the phosphor matrix.

In some known rare earth oxysulfide phosphors, a silicon-containing material, e.g., elemental silicon or colloidal silica, has been added to the starting formulation in order to control particle size. However, in the gadolinium oxysulfide phosphors of Formula (1), above, incorporation of silicon in the phosphor matrix has been thought to require the presence of fluorine in the matrix.

In both of the above aspects of the present invention, however, the silicon is added to the starting formulation to produce the phosphor in the form of metasilicic acid, $H_2SiO_3$. It has been found that, when metasilicic acid is used as the silicon source, no fluorine is required to achieve incorporation of the silicon into the phosphor. Thus, the resulting phosphor matrix includes essentially no fluorine.

BRIEF DESCRIPTION OF THE DRAWINGS

For a better understanding of the present invention, together with other objects, features, advantages, and capabilities thereof, reference is made to the following Description and appended Claims, together with the Drawings in which:

FIG. 2 is a graphical representation of the green:blue emission ratios of the phosphors of FIG. 1.

DETAILED DESCRIPTION OF THE PREFERRED EMBODIMENTS

Figure 1:
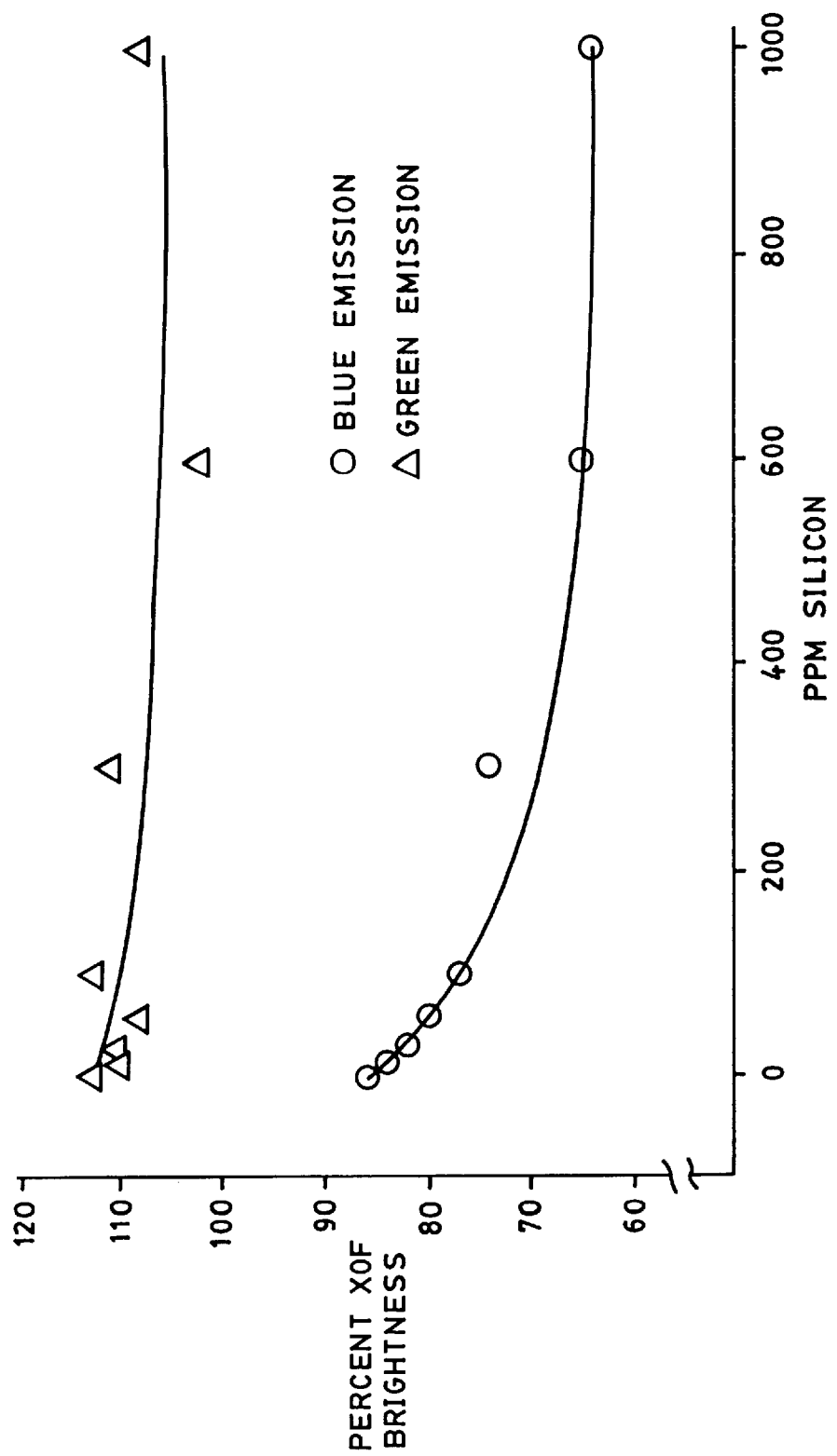
FIG. 1 is a graphical representation of the green and blue emissions of terbium-activated gadolinium oxysulfide phosphors containing varying amounts of silicon and no fluorine, in accordance with one embodiment of the present invention.

As used herein, the term "phosphor" refers to a material capable of exhibiting luminescence when subjected to proper excitation. The phosphors described herein are terbium-activated gadolinium oxysulfide phosphors including essentially no fluorine. The term "enhanced" as used herein is intended to mean "increased" or "made greater."

A minute amount of silicon has been added to terbium-activated gadolinium oxysulfide phosphors represented by the nominal formula $Gd_{2-x}O_2S:xTb$ (designated above as Formula 1), where x is 0.001 to 0.2, during their synthesis, significantly altering the green:blue emission ratio of the phosphor. Adding a sufficient amount of silicon to these phosphors reduces the blue emission as measured by the x-ray optical fluorescence (XOF), while the green emission remains approximately constant. Amounts between about 10 and 1000 ppm (parts per million) are preferred, since the affect of amounts less than 10 ppm is too slight to be of value in most applications, and the ratio appears to approach a maximum at an amount between 800 and 1000 ppm. Most preferred are amounts of silicon between about 30 and 1000 ppm.

As mentioned above, the silicon is added to the starting formulation in the form of metasilicic acid, $H_2SiO_3$, which leaves no residue after firing and washing of the phosphor. The use of the metasilicic acid as the silicon source has been found to eliminate the need for adding fluorine to the starting formulation to effect incorporation of the silicon in the phosphor matrix. The starting formulation including the metasilicic acid is thoroughly blended by any means known in the art for blending such phosphors. The weight percent of silicon required to produce the desired alteration of the green:blue emission ratio of any particular phosphor may be empirically determined. The powders are then fired in known manner, e.g., at 1000°–1400° C., to produce the phosphor having the desired degree of alteration in its green:blue emission ratio. Because of the use of metasilicic acid as the silicon source, the phosphor matrix includes essentially no fluorine.

The following Example is presented to enable those skilled in the art to more clearly understand and practice the present invention. The Example should not be considered as a limitation upon the scope of the present invention, but merely as being illustrative and representative thereof.

EXAMPLE

The starting powder formulations shown in Table I were combined and thoroughly blended by mixing with 250 cc of ⅜" alumina bead in a 1 liter plastic bottle (a Nalgene bottle) and roll milling each mixture in the bottle for 1 hour at 80 bottle-rpm. The amounts of $H_2SiO_3$ were selected to produce samples including the proportions of silicon shown in the Tables and in FIGS. 1 and 2. A control sample including no silicon was also similarly prepared.

The powder mixtures were placed in alumina crucibles, covered, and fired in a gas fired or electric furnace for 4 hours at about 1200° C. to produce the phosphor samples. The samples were cooled and washed with de-ionized water to remove any soluble by-products. The samples were dried for 2.0–4.0 hours at 100°–150° C., then heated in a crucible or tray in ambient air for 2 hours at 525° C.

The samples were then sieved and analyzed to determine the ppm silicon in each, and the XOF brightness of each phosphor was measured. The green and blue emissions and the green:blue emission ratio of the samples are shown Table II and in FIGS. 1 and 2.

TABLE I

| | | |
|---|---|---|
| $Gd_2O_3$ | | 287.1 g |
| $Tb_4O_7$ | | 2.991 g |
| $Na_2CO_3$.anhydrous | | 72.08 g |
| Sulfur | | 153.9 g |
| $Na_2HPO_4$ | | 22.72 g |
| $H_2SiO_3$ | 10 ppm | 0.0093 g |
| | 30 ppm | 0.0278 g |
| | 60 ppm | 0.0555 g |
| | 100 ppm | 0.0925 g |
| | 300 ppm | 0.2780 g |
| | 600 ppm | 0.5550 g |
| | 1000 ppm | 0.9250 g |

TABLE II

| PPM | % X OF BRIGHTNESS | | GREEN/BLUE RATIO |
|---|---|---|---|
| | GREEN | BLUE | |
| 0 | 113 | 86 | 1.31 |
| 10 | 110 | 84 | 1.31 |
| 30 | 110 | 82 | 1.34 |

TABLE II-continued

| PPM | % X OF BRIGHTNESS | | GREEN/BLUE RATIO |
|---|---|---|---|
| | GREEN | BLUE | |
| 60 | 108 | 80 | 1.35 |
| 100 | 113 | 77 | 1.47 |
| 300 | 111 | 74 | 1.50 |
| 600 | 102 | 65 | 1.57 |
| 1000 | 108 | 64 | 1.69 |

As shown in FIG. 1, the brightness of the blue emission decreases with increasing amounts of silicon, while the brightness of the green emission exhibits much less variation. This disparity produces an increase in the green:blue emission ratio with increasing silicon addition, as shown in FIG. 2, up to a level of between about 800–1000 ppm silicon. Thus, the green:blue emission ratio may be tailored, e.g., to suit the spectral sensitivity of a particular x-ray film.

The invention described herein presents to the art novel, improved terbium-activated gadolinium oxysulfide phosphors in which the green:blue emission ratio is enhanced by the addition of silicon without the addition of fluorine. The use of metasilicic acid in the phosphor synthesis eliminates the need for the addition of a fluorine-containing compound to the starting formulation.

While there has been shown and described what are at present considered the preferred embodiments of the invention, it will be apparent to those skilled in the art that modifications and changes can be made therein without departing from the scope of the present invention as defined by the appended Claims.

I claim:
1. A method of enhancing the green:blue emission ratio of a terbium-activated gadolinium oxysulfide phosphor comprising a gadolinium oxysulfide matrix of the formula:

$$Gd_{2-x}O_2S:xTb$$

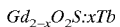

wherein x is 0.001–0.2 and said matrix includes essentially no fluorine, said method comprising:

incorporating an amount of silicon into said matrix sufficient to yield an enhanced green:blue emission ratio.
2. A method in accordance with claim 1 wherein said amount is between about 10 ppm and 1000 ppm.
3. A method in accordance with claim 2 wherein said amount is between about 30 ppm and 1000 ppm.
4. A method in accordance with claim 1 wherein metasilicic acid is added to a starting formulation for producing said phosphor at a weight selected to achieve said amount.
5. A method in accordance with claim 4 wherein said amount is between about 10 ppm and 1000 ppm.
6. A method in accordance with claim 4 wherein said amount is between about 30 ppm and 1000 ppm.

* * * * *